US007467591B1

(12) United States Patent
Horn

(10) Patent No.: US 7,467,591 B1
(45) Date of Patent: Dec. 23, 2008

(54) PLANTER WITH RETRACTABLE ACCESS

(75) Inventor: Rodney Samuel Horn, Woodridge, IL (US)

(73) Assignee: CNH America, LLC, Racine, WI (US)

( * ) Notice: Subject to any disclaimer, the term of this patent is extended or adjusted under 35 U.S.C. 154(b) by 0 days.

(21) Appl. No.: 11/846,615

(22) Filed: Aug. 29, 2007

(51) Int. Cl.
  *A01B 15/14* (2006.01)
  *A01B 23/04* (2006.01)
  *A01B 35/20* (2006.01)
  *A01B 39/24* (2006.01)
  *A01C 15/00* (2006.01)

(52) U.S. Cl. ...................... 111/200; 172/776

(58) Field of Classification Search ............... 172/776; 111/200
  See application file for complete search history.

(56) References Cited

U.S. PATENT DOCUMENTS

| | | | |
|---|---|---|---|
| 2,018,325 A | 10/1935 | Schnell |
| 3,254,919 A | 6/1966 | Birchmeier |
| 3,662,653 A | 5/1972 | Carlson et al. |
| 4,073,345 A | 2/1978 | Miller |
| 4,373,851 A | 2/1983 | Confoey |
| 4,529,215 A | 7/1985 | Strand |
| 4,634,170 A | 1/1987 | Lach |
| 4,744,548 A | 5/1988 | Hathaway |
| 5,094,583 A | 3/1992 | Bills, Jr. et al. |
| 5,358,225 A | 10/1994 | Volpel et al. |
| 5,826,523 A | 10/1998 | Gregor |
| 5,878,679 A | 3/1999 | Gregor et al. |
| 5,947,040 A | 9/1999 | Gregor |
| 5,996,515 A | 12/1999 | Gregor et al. |
| 6,148,748 A | 11/2000 | Bardi et al. |
| 6,149,374 A | 11/2000 | Dershem et al. |
| 6,581,530 B1 | 6/2003 | Hall et al. |
| 6,588,351 B1 | 7/2003 | Hall et al. |
| 6,591,766 B2 | 7/2003 | Williames |
| 6,595,148 B2 | 7/2003 | Meyer et al. |
| 6,688,242 B2 | 2/2004 | Meyer et al. |
| 6,935,254 B2 | 8/2005 | Ostrander et al. |
| 7,051,663 B2 | 5/2006 | Meyer et al. |
| 2003/0084829 A1 | 5/2003 | Lempriere |
| 2004/0187755 A1 | 9/2004 | Memory |
| 2004/0255774 A1 | 12/2004 | Hill |
| 2006/0243179 A1 | 11/2006 | Landphair et al. |

FOREIGN PATENT DOCUMENTS

| | | |
|---|---|---|
| JP | 05306099 A | 11/1993 |
| JP | 2004125160 A | 4/2004 |

OTHER PUBLICATIONS

U.S. Appl. No. 11/846,852, Rodney Samuel Horn.
U.S. Appl. No. 11/846,668, Rodney Samuel Horn.
U.S. Appl. No. 11/955,894, Rodney Samuel Horn.

*Primary Examiner*—Christopher J. Novosad
(74) *Attorney, Agent, or Firm*—Rebecca Henkel

(57) ABSTRACT

A towed implement, such as a planter is provided with a folding platform allowing easy access to upper regions of the implement. The platform may be provided in addition to a transverse platform or other upper walkway, such as for access to seed tanks in planters. The folding platform may be deployed, along with handrails and a ladder for accessing the platform for servicing the implement. When not in use, the folding platform may be collapsed or folded, and other ancillary structures, such as the ladder may be moved to stowed positions.

20 Claims, 3 Drawing Sheets

PLANTER WITH RETRACTABLE ACCESS

BACKGROUND

The present invention relates generally to agricultural implements, and more particularly to a planter or similar implement designed to be towed behind a work vehicle, and that is equipped with a ladder or stairway and a platform permitting a worker to service the implement.

A wide range of agricultural implements are know and are presently in use, particularly designed for towing behind a work vehicle, such as a tractor. In one family of such implements, including tillers, planters, and so forth, a wide swath of ground can be tilled, planted, or otherwise worked in each pass of the implement in a tilled or untilled field. Planters, for example, often include frames supported by series of wheels and a tool bar extending transversely with respect to a line of movement of the implement across the field. Attached to the tool bar are a series of row units for dispensing seeds in parallel rows either in tilled or untilled soil. Seed tanks are typically supported on the implement support structure, such as just forward of or over the tool bar. Large amounts of seed may be poured into these tanks and, as the implement is advanced across the field, seeds are transferred from the tanks by the distribution system connected to the row units.

Difficulties may arise in servicing such implements owing to the need to access the upper portions of the equipment, such as the seed tanks in planters. The seed tanks may, for example, have fill openings or lids that can be removed to pour the desired seeds into the tanks prior to deploying the implement in a field. Such seeds may be inserted automatically, semi-automatically or manually into the tanks. Both before and after hauling the implement to and from the field, and while the implement is in a field, operator access to the seed tanks may be needed, such as for filling, inspection, removal of debris, and so forth. In traditional planter designs, however, the operator may be obliged to climb on the tool bar or implement support structure to access the seed tanks and any other upper-level elements of the implement. While this, in certain situations, may not pose particular problems, it is inconvenient and renders many operations difficult, such as for loading heavy sacks of seed into the tanks.

There is a need, therefore, for improved arrangements in towed implements that permit operators to more easily access upper levels of the implements, such as seed tanks in planters. There is a particular need for arrangements that permit an operator to climb on, stand on, and remain on such upper levels for extended periods, and to move securely on such levels while manipulating heavy articles, such as bags of seed.

BRIEF DESCRIPTION

The present invention provides a novel arrangement for accessing and servicing planters and similar towed implements designed to respond to such needs. In an exemplary embodiment, for example, the implement has a folding platform mounted on and carried by the implement support structure, such as in a central towed section of the implement. The folding platform may extend generally horizontally or may be slightly inclined fore and aft, and may be centrally located along a central or longitudinal axis of the implement. The height of the platform is such as to permit an operator to stand on and easily access upper components of the implement. A ladder or stairway, including handrails may extend rearwardly from the platform, or in another direction that will not preclude normal operation of the implement in use. The ladder allows the operator to easily mount the platform for servicing.

The folding platform may communicate with other platforms to provide greater access to the tanks. For example, a fixed platform may be provided aft of the tanks, and the folding platform may extend from near the same level towards the aft end, over the row units.

In a particular embodiment, the implement may be a planter, and may include a pair of seed tanks on either side of a longitudinal center line of the implement. The folding platform in this case may extend rearwardly over a level at which the row units are disposed. The folding platform and ladder are higher than the row units, and can be folded generally along a line parallel to the center line of the implement. The ladder may also be retracted, and hand rails, if provided, may also move towards one another. With these elements in such stowed positions, they avoid any interference with the centermost row units, and permit the implement to tow other implements, where desired.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
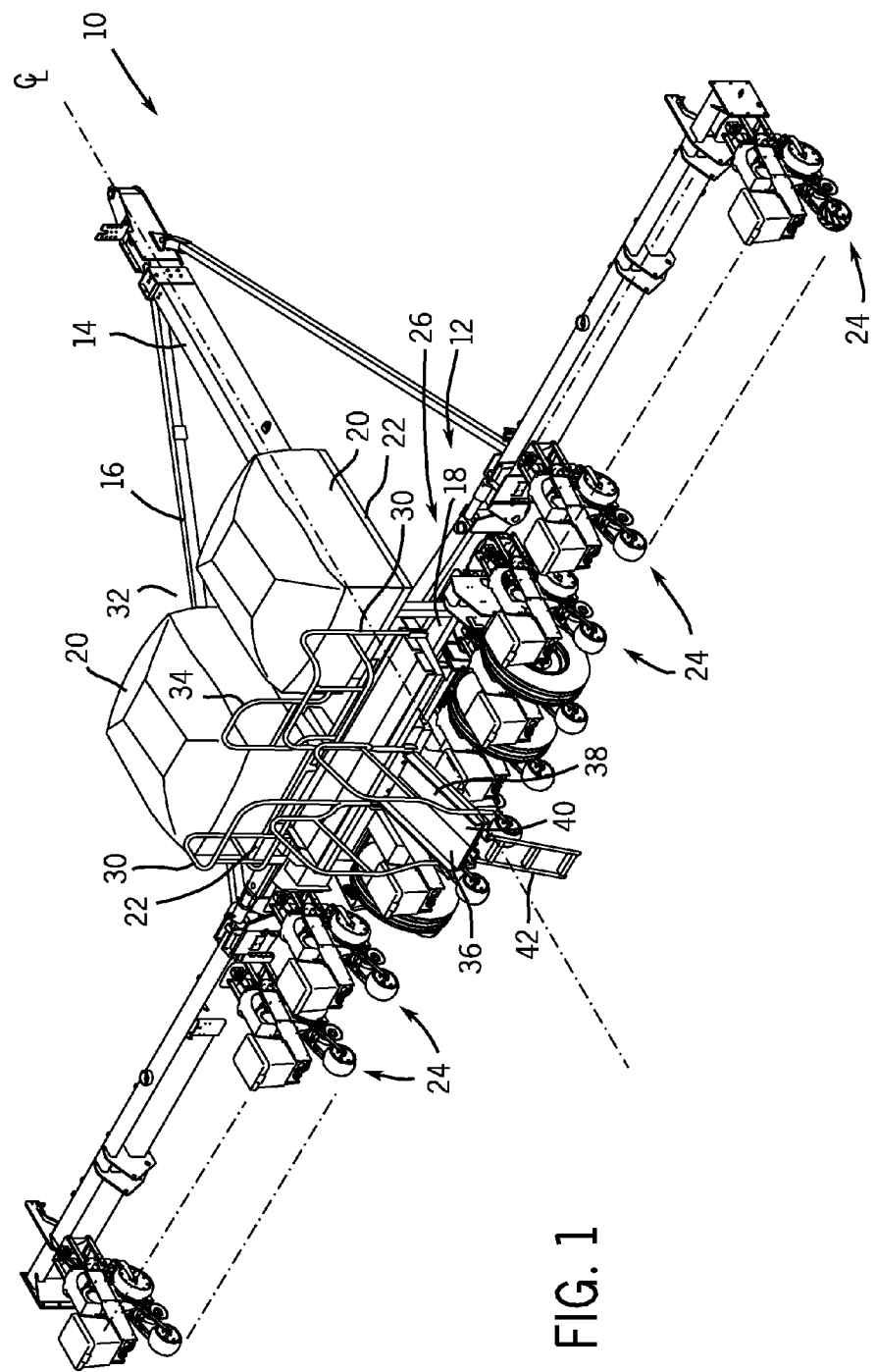
FIG. 1 is a rear perspective view of a planter in accordance with aspects of the invention, including a fixed platform or walkway, a folding platform, and a retractable ladder for accessing a region near the upper components of the planter, particularly seed tanks.

Turning now to the drawings, and referring first to FIG. 1, an implement 10 is illustrated generally in the form of a planter. The planter is designed to towed behind a work vehicle, such as tractor (not shown). The implement 10 consists of a frame, designated generally by reference numeral 12 that may be made of any suitable material, such as structural steel. A tow bar 14 of the frame forms a fore-end-aft longitudinal beam designed to be connected to the towing work vehicle. Draft tubes 16 extend rearwardly from a forward end of the tow bar to aid in drawing the tool bar in use.

In the illustrated embodiment, a pair of feed tanks 20 are mounted on the implement frame, and supported by tank support structures 22. These support structures will typically include structural steel and truss members, as well as seed tank support platforms on which the tanks are mounted. Each of the tanks will typically include a cover or lid that can be removed for loading of seeds in automated, semi-automated or manual operations. The covers also permit inspection of the seeds, removal of debris, and so forth.

The frame 12 further includes a tool bar secured generally transverse to the tow bar 14, on which row units 24 are mounted. As will be appreciated by those skilled in the art, the row units may serve various functions, depending upon the design, the nature of the field to be planted (e.g., tilled or untilled), the particular seeds to be planted, and so forth. Structures of each row unit may typically include and opener disc, a metering system, a covering disc, a firming wheel, and so forth. Accommodations may be made for fertilizers, dispensing of fertilizers, and the like. The row units are spaced apart along the tool bar to provide the desired spacing of rows of crops after seeding. Transport wheels (partially visible in the figures) will typically be provided in a center section of the implement to allow the row units to be raised out of contact with road surfaces for transport of the implement. Moreover, as will be appreciated by those skilled in the art, depending upon the width of the implement, the tool bar may define a central portion and outwardly extending wings that can be folded forwardly and upwardly to reduce the overall width of the implement for road transport. A distribution system, designated generally by reference numeral 26 is provided for transferring seeds from seed tanks 20 to each of the row units 24. Moreover, additional recipients, tanks or hoppers may be removably mounted on each of the row units for receiving seeds, fertilizer, or other materials to be dispersed in the field.

To facilitate access, servicing, inspection and so forth of the seed tanks 20, a transverse platform 28 is provided. This platform may be mounted at generally the same level as the supports for the seed tanks, and may extend generally transverse to the direction in which the implement is towed. While other arrangements may be envisaged, the transverse orientation of platform 28 allows for easy access to both seed tanks from a rear or aft position. A handrail 30 at least partially surrounds platform 28 to allow the operator greater stability in servicing the tanks. A space 32 between the tanks may be barred by an additional handrail 32, or platform 28 may extend forwardly between the tanks, with the handrail 34 being mounted further forward then the position illustrated in the figures.

Figure 2:
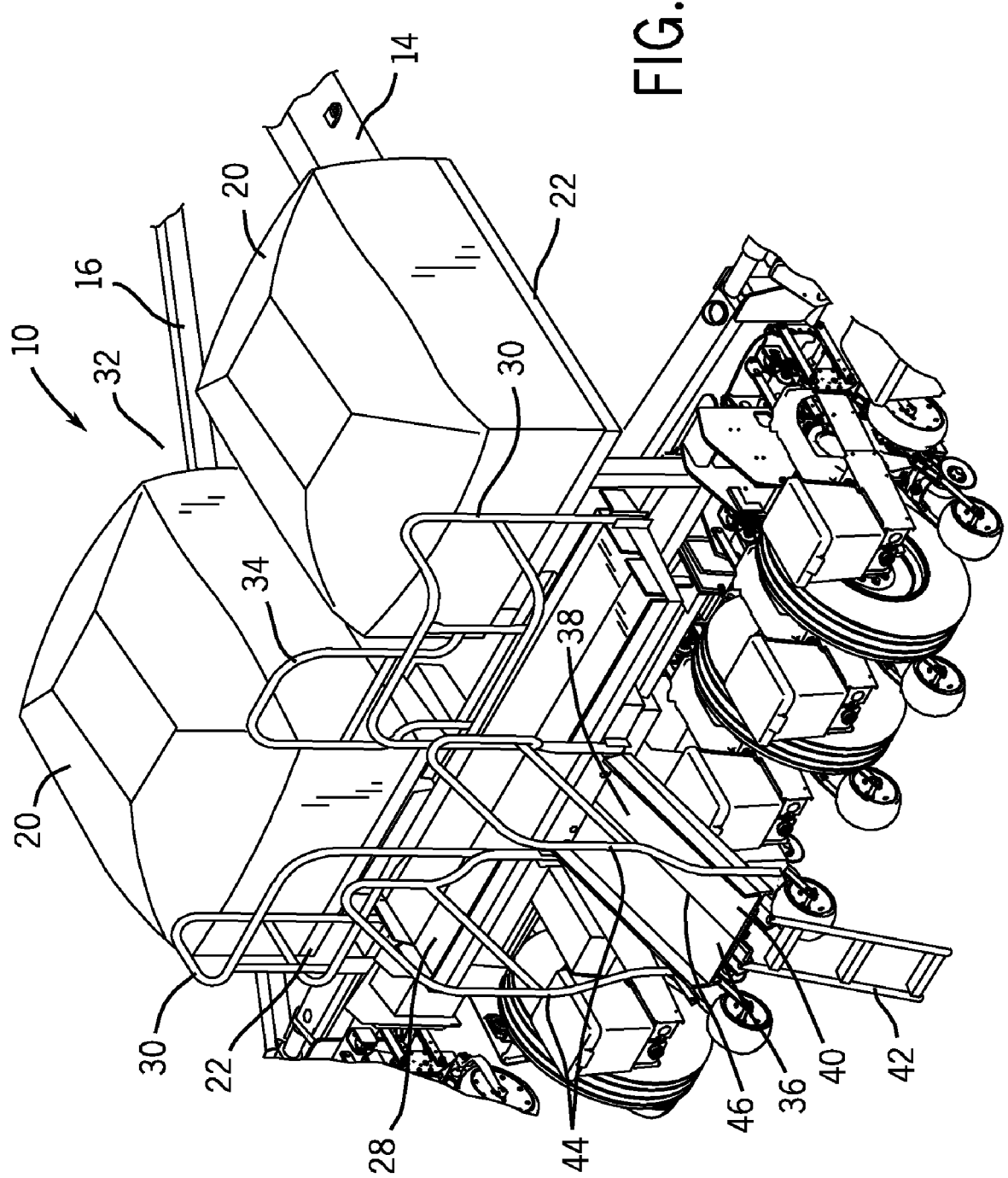
FIG. 2 is a more detailed view of the arrangement of FIG. 1, showing the folding platform or walkway and a presently contemplated arrangement for the ladder, in which view the ladder is lowered or deployed for easily accessing the platform.

As shown in somewhat greater detail in FIG. 2, on a rear side or edge of platform 28 a folding platform 36 is provided. Platform 36 allows the operator to access upper components of the implement, particularly the seed tanks 20 by mounting above the central-most row units. In the illustrated embodiment, a forward end 38 of the folding platform 36 is at approximately the same level as the transverse platform 28, allowing easy access to the transverse platform. A rear or aft end 40 of the folding platform may be slightly lower than the forward end thereof, and the lower end may, where desired, be raised and lowered by the underlying support structure for the platform. This support structure would typically include braces or beams extending from the implement frame, as well as beams or support structures extending below the platform to the tool bar. A ladder 42 is attached to the support structure for the folding platform and may be lowered for climbing up to the platform from the ground. One or more handrails 44 may be provided on ether side of the platform, with two such handrails being illustrated in the figures.

The ability to fold the platform 36 allows for a wider platform to be utilized then could be disposed between centrally-located row units. That is, depending upon the nature of the crop being seeded, the row units may be fairly closely spaced. Access to platform 28 may be difficult, then, if a narrow access platform is employed. The folding platform 36, however, allows for a wider passage, so that operators, bags of seed, tools and so forth may be brought to and removed from the upper regions of the implement, and in the illustrated embodiment to platform 28.

Platform 28 and platform 36 may be made of any suitable materials. For example, sheet steel may be employed for the bases or walking surfaces of the platforms, which may be bent to form or provided with flanges to prevent tools and other implements from being inadvertently dropped or kicked from the platforms. The platforms may also be covered with an anti-skid coating or appliqué to improve footing. Expanded metals, textured surfaces, and so forth may also be employed for similar purposes.

Folding platform 36 may fold in various ways, with a single fold dividing two parallel panels being illustrated in the figures. A fold line 46 (see FIG. 2) may be defined along the fore-and-aft center line of the platform, which may be generally aligned with a fore-and-aft centerline C of the implement (see FIG. 1). Where two such panels are provided for the folding platform, these may be joined to one another and to a support structure at pivot points, or by hinges as will be generally appreciated by those skilled in the art. Thus, while the fold line 46 of the platform may generally stay at the same elevation when the platform is deployed in a service position or stowed in a folded position, the panels on either side of the fold line may be folded upwardly. Thus, when unfolded in the service position, the weight of the operator will tend to press the panels downwardly in a stable manner.

Figure 3:
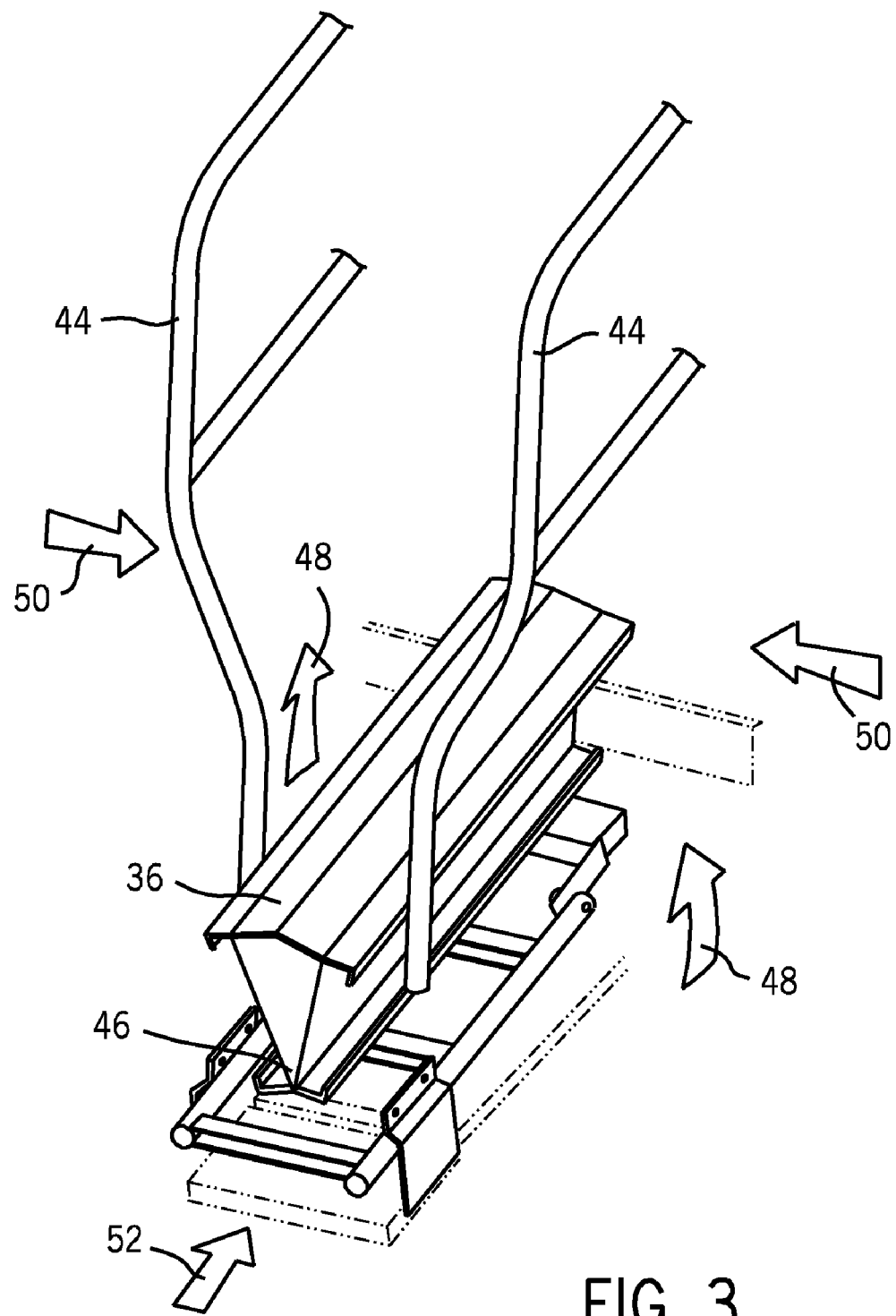
FIG. 3 is a detailed view of the same arrangement, with the folding platform folded and the ladder stowed.

FIG. 3 illustrates the platform 36 in its stowed or folded position. As noted above, in the illustrated embodiment two parallel panels define the platform, that are folded upwardly along the central fold line 46, as indicated generally by arrows 48 in FIG. 3. Moreover, in a presently contemplated embodiment illustrated, handrails 44 on either side of the folding platform may be moved inwardly toward one another as indicated by arrows 50 in FIG. 3 to reduce the width of the stowed structures. The handrails may be moved, for example, by sliding motion along the support structure of the transverse platform 28. Other arrangements may be envisaged, in which the handrails are folded forward, folded downward, or otherwise stowed. Similarly, ladder 42 may be stowed by folding the ladder upwardly along a pivot line, or by sliding the ladder into a stowed position, as indicated by arrow 52 in FIG. 3, beneath the foldable platform. Stowing of the ladder and platform allow for the overall height of these components to be raised far beyond a point of any interference with the ground, and to permit access to any additional towing structures that may be provided along a rear side of the implement, such as for towing fertilizer dispersers, and so forth.

It should be noted that the folding platform may be designed to include more than two folding panels. For example, a central non-folding panel may be provided with sides or wings that are folded upwardly or downwardly. Also, it should be noted that the level of the folding platform may be fixed or adjustable to allow an operator to step directly to and from a work vehicle, such as a truck or wagon onto and from the folding platform. This level and level adjustment may aid in walking between the implement and the vehicle, such as for transport of tools, seeds, and so forth. Moreover, folding of the platform and raising of the ladder allow these components to be moved away from the nearest row units, permitting these row units to rise and fall as the implement is drawn across a field with varying contours.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towed agricultural implement comprising:
 a frame including a tool bar extending generally transverse to a central axis along which the implement is towed in operation;

a plurality of ground-contacting units coupled to the frame and disposed generally beneath the tool bar; and a folding operator platform supported on the frame and disposed generally fore-and-aft above the ground-contacting units, wherein the folding platform includes a pair of folding panels; and a retractable ladder extending from the folding platform aft behind the ground-contacting units.

2. The implement of claim 1, wherein the panels fold along a line generally parallel to the central axis.

3. The implement of claim 1, comprising at least one tank supported generally above the tool bar and a fixed operator platform extending generally transverse to the central axis aft of the tank.

4. The implement of claim 3, wherein the folding platform is disposed aft of the fixed platform.

5. The implement of claim 4, wherein a forward edge of the folding platform is disposed substantially at a level of the fixed platform when the folding platform is unfolded.

6. The implement of claim 1, wherein the ladder is displaceable into a space below the folding platform when the platform is folded.

7. The implement of claim 1, comprising a pair of hand rails disposed on lateral sides of the folding platform.

8. The implement of claim 7, wherein the hand rails are moveable inwardly towards one another when the platform is folded.

9. The implement of claim 1, wherein the retractable ladder is extendable from and retractable into a ladder storage receptacle, and the folding panels are foldable and unfoldable directly above the ladder storage receptacle.

10. A towed agricultural implement comprising:
a frame including a tool bar extending generally transverse to a central axis along which the implement is towed in operation;
at least one seed tank supported by the frame and generally above the tool bar;
a seed distribution system for distributing seeds from the tank;
a plurality of row units coupled to the frame and disposed generally beneath the tool bar, the row units receiving seeds from the distribution system during operation; and
a plurality of row units coupled to the frame and disposed generally beneath the tool bar;
a fixed operator platform extending generally transverse to the central axis aft of the tank;
a folding operator platform supported on the frame and disposed generally fore-and-aft above the row units and aft of the fixed platform, wherein the folding operator platform includes a pair of folding panels; and
a retractable ladder extending from the folding platform aft behind the row units.

11. The implement of claim 10, wherein the panels fold along a line generally parallel to the central axis.

12. The implement of claim 10, wherein a forward edge of the folding platform is disposed substantially at a level of the fixed platform when the folding platform is unfolded.

13. The implement of claim 10, wherein the ladder is displaceable into a space below the folding platform when the platform is folded.

14. The implement of claim 10, comprising a pair of hand rails disposed on lateral sides of the folding platform.

15. The implement of claim 14, wherein the hand rails are moveable inwardly towards one another when the platform is folded.

16. The implement of claim 10, wherein the retractable ladder is extendable from and retractable into a ladder storage receptacle, and the folding panels are foldable and unfoldable directly above the ladder storage receptacle.

17. A towed agricultural implement comprising:
a frame including a tool bar extending generally transverse to a central axis along which the implement is towed in operation;
a plurality of seed tanks supported by the frame and generally above the tool bar;
a seed distribution system for distributing seeds from the tanks;
a plurality of row units coupled to the frame and disposed generally beneath the tool bar, the row units receiving seeds from the distribution system during operation; and
a plurality of row units coupled to the frame and disposed generally beneath the tool bar;
a fixed operator platform extending generally transverse to the central axis aft of the tanks;
a folding operator platform supported on the frame and disposed generally fore-and-aft above the row units and aft of the fixed platform, the folding platform being foldable along a line generally parallel to the central axis;
a pair of hand rails disposed on lateral sides of the folding platform and movable inwardly towards one another when the platform is folded; and
a retractable ladder extending from the folding platform aft behind the row units.

18. The implement of claim 17, wherein the folding platform includes a pair of folding panels.

19. The implement of claim 17, wherein a forward edge of the folding platform is disposed substantially at a level of the fixed platform when the folding platform is unfolded.

20. The implement of claim 17, wherein the ladder is displaceable into a space below the folding platform when the platform is folded.

* * * * *